Sept. 14, 1926.
W. R. WILLIAMS
RADIUS ROD COMBINATION FOR VEHICLES
Filed Jan. 25, 1923
1,599,937
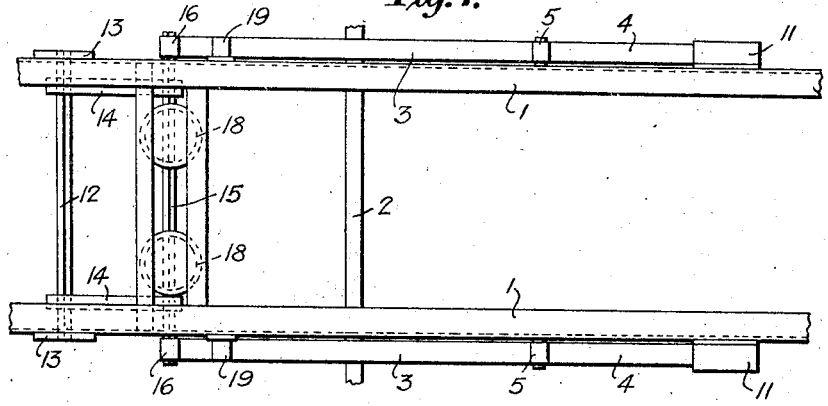
*Fig. 1.*
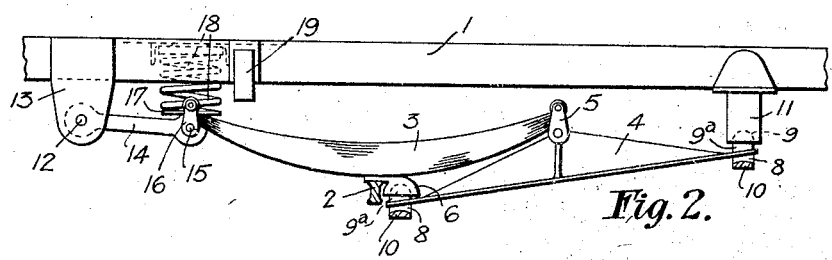
*Fig. 2.*
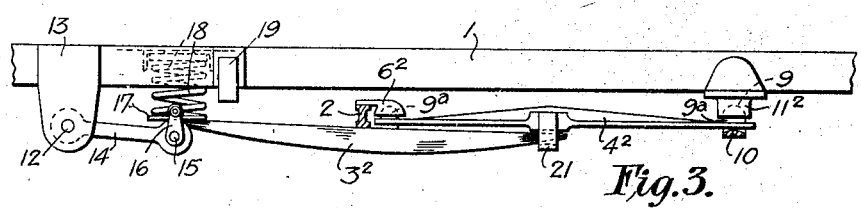
*Fig. 3.*
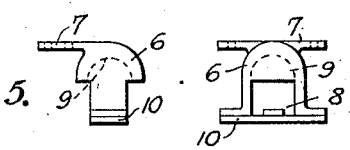 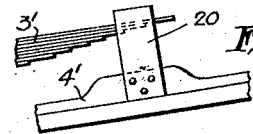
*Fig. 5.* *Fig. 6.* *Fig. 4.*
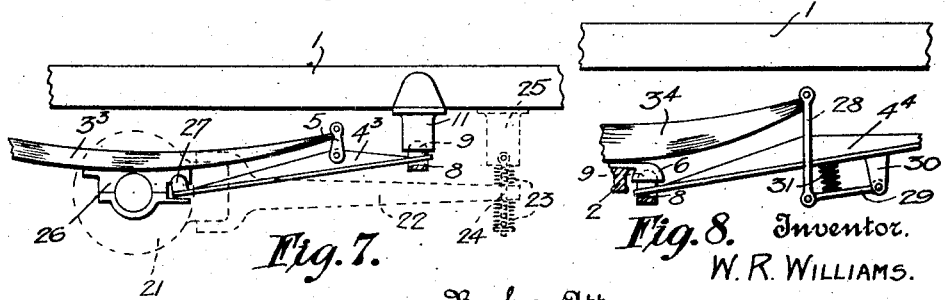 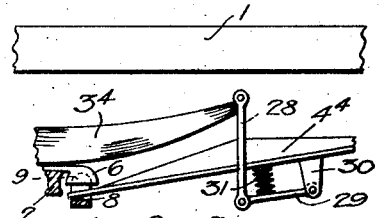
*Fig. 7.* *Fig. 8.*
Inventor.
W. R. Williams.
By his Attorneys Patented Sept. 14, 1926.

1,599,937

UNITED STATES PATENT OFFICE.

WILLIAM R. WILLIAMS, OF PHILADELPHIA, PENNSYLVANIA.

RADIUS-ROD COMBINATION FOR VEHICLES.

Application filed January 25, 1923. Serial No. 615,457.

This invention relates to an improved radius rod combination for vehicles which may be applied to vehicles generally, but is particularly applicable to motor driven vehicles designed to move at relatively high speeds.

The primary objects of the invention are to provide a substantial and highly efficient and wholly sprung or wholly spring supported connection between an axle of a vehicle and the suspended portion thereof; and an arrangement in which an axle of the vehicle will be maintained in desired relation to the suspended portion of the vehicle both with respect to proper position and degree of rotation about its axis, during the deflection of the suspension springs from minimum to maximum position.

A further object, with certain forms of construction, is to provide against excessive rotation of the axle about its axis during variations in deflection of the springs under running conditions.

Accordingly the invention comprises at each side of the vehicle, a radius element extending between and operatively associated with the axle and a suspended portion of the vehicle, and elastic means extending generally transversely of the axle and operatively associated with said axle and said radius element, whereby the latter is wholly sprung or wholly spring supported.

The invention also consists in the novel improvements, parts, combinations, and features of construction herein shown and described.

The invention is illustrated in different embodiments thereof in the accompanying drawings, in which:—

Fig. 1 is a plan view of part of the suspended portion or frame of a vehicle and the axle thereof together with the radius rod arrangement in accordance with the present invention.

Fig. 2 is a side view of the structure shown in Fig. 1.

Fig. 3 is a similar side view of a modified structure in which the suspension springs are underslung instead of overslung as in Figs. 1 and 2.

Fig. 4 is a detail view showing a modification of the manner of connecting the suspension springs with the radius elements in the construction shown in Fig. 2.

Figs. 5 and 6 are detail side and end views of the device employed in Fig. 2 for connecting the radius element with the axle of the vehicle.

Fig. 7 is a side view showing a further application of the invention.

Fig. 8 is a fragmentary side view showing a further modification of the invention.

Referring firstly to Figs. 1 and 2, which show the overslung arrangement of the springs, 1 indicates a part of the suspended portion or frame of the vehicle which may be of any suitable or usual construction, and 2 indicates an axle of the vehicle, in this case the front axle thereof, although it will be understood that the invention may be applied to either the front or the rear end of the vehicle frame and disposed either at front or rear of either axle. Disposed at opposite sides of the suspended portion of the vehicle and extending transversely of and supported upon the axle 2 are the two elastic elements or springs 3 which in the construction shown are semi-elliptic leaf springs of usual form. These leaf springs may be connected at their intermediate portions with the axle by means of shackle or clip bolts (not shown) or in any other suitable or usual manner. The left hand ends of the springs 3 are operatively associated or connected with the suspended portion of the vehicle either directly, as by the use of the usual shackle or clip connections, but preferably through the medium of the stress-transmitting device shown in Figs. 1 and 2 and which will be more fully described hereafter.

Disposed at opposite sides of the suspended portions of the vehicle adjacent the elastic elements or springs 3 are two radius elements or rods 4, each of which, in the construction shown, is operatively associated or connected at one end with the axle 2 and at its other end with the suspended portion or frame 1 of the vehicle. Each radius element or rod is also operatively associated or connected between its ends with the right hand end of the adjacent elastic element or spring 3, the connection between the spring and radius element being effected by any suitable connecting means, for example, the shackle connection indicated at 5 particularly in Fig. 2.

The connection of the ends of the radius element 4 with the axle 2 and the suspended portion or frame 1 of the vehicle may be effected in any suitable manner but preferably such ends are pivotally or universally associated or connected with said axle and suspended portion so as to enable the radius element to move freely and easily relatively to the axle and suspended portion during the deflection of the elastic element or spring under load or shock. The connection is preferably also effected through the medium of anti-friction elements so as to avoid or automatically take care of wear which is particularly desirable in vehicle service.

The connection of the radius element with the axle may be advantageously effected by the use of the means shown on an enlarged scale in Figs. 5 and 6 and which comprises a bracket 6 having a flange 7 which is adapted to be secured to the axle by means of the shackle or clip bolts (not shown) employed to connect the adjacent spring 3 to said axle. This bracket 6 is provided at the lower part thereof with an opening 8 through which the end of the radius element 4 extends and is provided above said opening with a substantially semi-spherical socket 9 adapted to receive a substantially semi-spherical projection or ball 9ª provided upon the end of the radius element. The lower side of the opening 8 is closed by a plate 10 secured to the bracket to prevent displacement of the radius element under abnormal conditions, the upper surface of this plate being provided with a soft or non-metallic lining. This form of connecting means establishes a definite operative connection of the end of the radius element with the axle and at the same time permits pivotal or universal movement of the end of the radius element relatively to the axle. The ball and socket construction also reduces the wear and automatically takes care thereof. The ball socket may of course be made integral with the axle if desired.

The connection of the other end of the radius element with the suspended portion or frame 1 of the vehicle is preferably effected by means of a bracket 11 suitably connected at its upper end with the frame 1 and having its lower portion formed similarly to the lower portion of the bracket 6, the corresponding parts of the bracket 11 being similarly referenced.

It will be seen that with the construction described, the axle 2 will be held in its proper position by the radius elements 4 during the deflection of the springs 3 from minimum to maximum loads, and as the radius rod ends of the springs will deflect more than the other ends thereof this will tend to keep the axle, in the case of a front axle, in its proper rake as distinct from having this rake changed by the axle swinging from the outer ends of the springs when attached to the frame in the usual manner.

The radius element construction above described is particularly advantageous in connection with the construction illustrated in Figs. 1 and 2 in which auxiliary spring means are provided co-operating with the springs 3 through the medium of a stress transmitting device for the purpose of increasing the degree of action of the elastic element or springs usually employed without in any way decreasing the stability of the vehicle.

The stress transmitting device as shown comprises a rigid transverse member 12 mounted to rock in brackets 13 carried at the suspended portion of the frame 1 of the vehicle, this transverse member 12 having secured thereto to rock therewith arms 14 extending generally longitudinally of the vehicle. The left hand ends of the elastic elements or springs 3 are connected with the free ends of the arms 14 preferably through the medium of a transverse rod or bar 15 passing through and secured to the ends of these arms and to the ends of which the springs are connected for example by shackle connections 16. The springs 3 both act upon the free ends of the arms 14 in one direction of rotation.

Interposed between the suspended portion or frame 1 of the vehicle and the spring seats 17 suitably connected to or supported upon the transverse bar 15 are the auxiliary spring means 18 which in the particular form shown comprises two helical compression springs. It will be seen that the springs 18 act upon the free ends of the arms 14 in the direction of rotation opposite to that in which the springs 3 act upon said arms. With this arrangement any stress communicated to either one of the springs 3 will be transmitted by the rigid stress transmitting device comprising the members 12 and 14 to the springs 18, and the elasticity of the suspension is amplified in the same manner as if the springs 3 were increased in flexibility instead of providing the auxiliary springs 18. The stress transmitting device however, by causing portions of oppositely disposed elastic elements to act in unison, eliminates excessive lateral tilting of the suspended portion of the vehicle, or lateral instability thereof, which would otherwise be caused by the addition of the extra springs or amplification of the elastic means. The radius element construction described, in holding the axle in proper position during the deflection of the springs 3 is of special advantage in connection with the means just described for amplifying the flexibility of the elastic elements.

In Figs. 1 and 2 the suspended portion of frame 1 is provided adjacent the left hand ends of the elastic elements or springs 3 with bumper members 19 adapted to directly engage the ends of the springs in the event of exceptional relative displacement between the frame and axle in order to prevent damage to or distortion of the springs 18, the load in such event being borne directly by the main elastic elements 3.

In the modification shown in Fig. 4 the radius element 4' has secured thereto an inverted U shaped plate or bracket 20 and the end of the main spring 3' simply engages under the bent over portion of this bracket, the spring moving somewhat relatively to the bracket during deflection of the spring similarly to the relative movement permitted by the shackle connection 5 in Fig. 2.

In the construction shown in Fig. 3 the relative arrangement of the parts is substantially similar to that described in connection with Figs. 1 and 2 excepting that the main elastic elements or springs $3^2$ are underslung instead of overslung, the springs being suitably connected with the axle beneath the same at the intermediate portions thereof as by means of shackle or clip bolts (not shown). The brackets $6^2$ and $11^2$ are substantially similar to those shown in Fig. 2. The radius element or bar $4^2$ extends between the brackets $6^2$ and $11^2$ and lies above the right hand portion of the spring $3^2$ this radius element having secured thereto a U-shaped bracket 21 within the lower portion of which lies the right hand end of the spring $3^2$ whereby this end of the spring is connected with the intermediate portion of the radius element. The remaining parts shown in Fig. 3 correspond with the similar parts in Fig. 2 and are similarly referenced.

Fig. 7 shows the invention applied to a rear axle construction of known form, in which the rear axle housing 21 is connected with the suspended portion of the vehicle by a torque member 22 pivotally connected at one end to the housing and at its other end positioned between springs 23 encircling a rod 24 carried by a bracket 25 secured to the suspended portion 1 of the vehicle. In this case, the spring $3^3$ is connected to the axle housing by a support 26 which is free to rotate relatively to the housing, and the radius rod $4^3$ is universally connected at 27 to said support and is connected to the end of the spring and to the suspended portion 1 in a manner similar to that shown in Figure 1.

In Fig. 8, the end of the spring $3^4$ is connected with the radius rod $4^4$ through the medium of a link or links 28, the lower ends of which are connected to another link or links 29 pivoted to a bracket or brackets 30 carried by the radius rod $4^4$, auxiliary springs 31 being interposed between the last mentioned links and the radius rod.

It will be understood that in each of the constructions shown herein, the radius rod is wholly sprung, or wholly spring supported, thereby automatically cutting down an undesirable factor, namely unsprung weight, while at the same time the ends of the radius rod are firmly and securely held in proper engagement with the axle and suspended portion of the vehicle, so as to overcome any looseness. This arrangement of radius rod provides an efficient non-rattling rod which is self-adjusting against incidental wear of its rubbed surfaces.

It is to be understood that the invention is not restricted to the particular details of construction shown in the drawings and herein set forth as the constructional features of the invention may be variously modified within the scope of the claims appended hereto.

What I claim and desire to secure by Letters Patent is:—

1. In a vehicle, the combination with an elastic element connected to and extending transversely of an axle of the vehicle and having one end thereof connected with a suspended portion of the vehicle, of a wholly sprung radius rod extending between said axle and a suspended portion of the vehicle, and connected at a point between its ends with the other end of said elastic element.

2. In a vehicle, the combination with elastic means arranged transversely of an axle of the vehicle and connected at one end thereof with a suspended portion of the vehicle, of a radius element operatively connected with the axle and a suspended portion of the vehicle and spring supported by the other end of said elastic means in such operative connection.

3. In a vehicle, the combination with elastic means extending transversely of and operatively associated with an axle of the vehicle, and operatively associated at one portion thereof with a suspended portion of the vehicle, of a wholly sprung radius element operatively associated with the axle and a suspended portion of the vehicle and with another portion of said elastic means.

4. In a vehicle, the combination with elastic means arranged transversely of an axle of the vehicle and connected at one end thereof with a suspended portion of the vehicle, of a radius element pivotally connected with the axle and a suspended portion of the vehicle, and spring supported by the other end of said elastic means in such pivoted connection.

5. In a vehicle, the combination with elastic means arranged transversely of an axle of the vehicle and connected at one end thereof with a suspended portion of the vehicle, of a wholly sprung radius element held by the other end of said elastic means in universally connected relation with the axle and a suspended portion of the vehicle.

6. In a vehicle, the combination with elastic means arranged transversely of an axle of the vehicle and connected at one end thereof with a suspended portion of the vehicle, a radius element operatively connected by means including anti-friction elements with the axle and a suspended portion of the vehicle, and wholly spring supported in such operative connection by operative connection with the other end of said elastic means.

7. In a vehicle, the combination with elastic means arranged transversely of an axle of the vehicle and connected at one end thereof with a suspended portion of the vehicle, and a radius element operatively connected with the axle and a suspended portion of the vehicle by means including ball and socket elements which are spring held in co-operative relation by operative connection of said radius element with the other end of said elastic means.

8. In a vehicle, the combination with elastic means arranged transversely of an axle of the vehicle and connected at one end thereof with a suspended portion of the vehicle, and a radius element operatively connected with the axle and a suspended portion of the vehicle and wholly spring supported in such operative connection by having a loose or movable connection with the other end of said elastic means.

9. In a vehicle, in combination, a radius element extending between and having operative engagement with an axle and a suspended portion of the vehicle, and elastic means extending generally transversely of said axle and operatively associated therewith and spring supporting said radius element in the aforesaid operative engagement.

10. In a vehicle, in combination, a radius element extending between and operatively engaged at its ends with an axle and a suspended portion of the vehicle, and an elastic element operatively connected to said axle and connected at one end thereof to said radius element between the ends of the latter and wholly spring supporting said element in said operative engagement.

11. In a vehicle, the combination with an axle, a suspended portion of the vehicle, and elastic means therebetween, of a radius rod operatively associated with said axle and suspended portion and wholly spring supported by said elastic means in such operative association.

12. In a vehicle, the combination with an axle, a suspended portion of the vehicle, and elastic means therebetween, of a wholly sprung radius rod operatively associated with said axle and suspended portion and with said elastic means.

13. In a vehicle, the combination with an axle, a suspended portion of the vehicle, and elastic means therebetween, of a radius rod operatively associated at its opposite ends with said axle and suspended portion and wholly spring supported in such operative association by operative association of said elastic means with the intermediate portion of said rod.

14. In a vehicle, the combination with an axle, a suspended portion of the vehicle, and elastic means therebetween, of a wholly sprung radius rod operatively associated at its opposite ends with said axle and suspended portion and at its intermediate portion with said elastic means.

15. In a vehicle, the combination comprising elastic means disposed at opposite sides of the vehicle and extending transversely of and operatively associated with an axle of the vehicle, radius elements disposed at opposite sides of the vehicle, operatively associated with the axle and a suspended portion of the vehicle, and each operatively connected with a portion of the elastic means at the same side of the vehicle, a transverse rigid member mounted to rock upon a suspended portion of the vehicle and acted upon by other portions of both of said elastic means in one direction of rotation, and auxiliary elastic means acting upon said rigid member in the opposite direction of rotation.

16. In a vehicle, the combination comprising elastic means disposed at opposite sides of the vehicle and extending transversely of and operatively associated with an axle of the vehicle, radius elements disposed at opposite sides of the vehicle, operatively associated with the axle and a suspended portion of the vehicle, and each operatively connected with a portion of the elastic means at the same side of the vehicle, a stress transmitting device consisting of a rigid hinge member supported upon a suspended portion of the vehicle for movement about a transverse axis, other portions of both of said elastic means acting upon the free end of said hinge member in one direction of rotation, and auxiliary elastic means also acting upon the free end of said hinge member in the opposite direction of rotation.

17. In a vehicle, the combination comprising elastic means disposed at opposite sides of the vehicle and extending transversely of and operatively associated with an axle of the vehicle, radius elements disposed at opposite sides of the vehicle, operatively associated with the axle and a suspended portion of the vehicle, and each operatively connected with a portion of the elastic means at the same side of the vehicle, a transverse rigid member mounted to rock upon a suspended portion of the vehicle and acted upon by other portions of both of said elastic means in one direction of rotation, and auxiliary elastic means interposed between the suspended portion of the vehicle and said rigid member and acting upon said rigid member in the opposite direction of rotation.

18. In a vehicle, the combination comprising elastic means disposed at opposite sides of the vehicle and extending transversely of and operatively associated with an axle of the vehicle, radius elements disposed at opposite sides of the vehicle, operatively associated with the axle and a suspended portion of the vehicle, and each operatively connected with a portion of the elastic means at the same side of the vehicle, a stress transmitting device consisting of a rigid transverse member mounted to rock upon a suspended portion of the vehicle, and arms extending therefrom and connected at their free ends to other portions of said elastic means to be acted upon thereby in one direction of rotation, and auxiliary elastic means acting upon the free ends of said arms in the opposite direction of rotation.

19. In a vehicle, the combination comprising elastic elements disposed at opposite sides of the vehicle and extending transversely of and connected to an axle of the vehicle, radius elements disposed at opposite sides of the vehicle and each connected at its ends to said axle and to the suspended portion of the vehicle, and connected between its ends with one end of the adjacent elastic element, a rigid hinge member supported upon a suspended portion of the vehicle for movement about a transverse axis and having its free portion acted upon by the other ends of both elastic elements in one direction of rotation, and auxiliary elastic means acting upon the free portion of said hinge member in the opposite direction of rotation.

20. In a vehicle, the combination comprising elastic elements disposed at opposite sides of the vehicle and extending transversely of and connected to an axle of the vehicle, radius elements disposed at opposite sides of the vehicle and each connected at its ends to said axle and to the suspended portion of the vehicle, and connected between its ends with one end of the adjacent elastic element, a rigid hinge member supported upon a suspended portion of the vehicle for movement about a transverse axis and comprising a rigid transverse member having arms extending in the same direction therefrom and connected to the other ends of said elastic elements to be acted upon thereby in one direction of rotation, and auxiliary, helical, compression spring means acting upon the ends of said arms in the opposite direction of rotation.

In testimony whereof I affix my signature.

WILLIAM R. WILLIAMS.